United States Patent [19]

Hahn et al.

[11] 4,218,511

[45] Aug. 19, 1980

[54] SELF-EXTINGUISHING, EXPANDABLE STYRENE POLYMERS

[75] Inventors: Klaus Hahn, Lampertheim; Manfred Walter, Speyer; Karl Stange, Neustadt; Heinz Weber, Gruenstadt, all of Fed. Rep. of Germany

[73] Assignee: BASF Aktiengesellschaft, Fed. Rep. of Germany

[21] Appl. No.: 965,266

[22] Filed: Dec. 1, 1978

[30] Foreign Application Priority Data

Dec. 21, 1977 [DE] Fed. Rep. of Germany ....... 2757020

[51] Int. Cl.² .............................................. B32B 1/00
[52] U.S. Cl. ............................ 428/407; 260/45.8 NT; 260/45.8 SN; 260/45.95 F; 521/57; 521/87; 521/90; 521/98; 521/146; 521/907
[58] Field of Search ........................... 521/57, 907, 98; 260/45.8 NT, 45.95 F; 428/407

[56] References Cited

U.S. PATENT DOCUMENTS

| | | | |
|---|---|---|---|
| 2,676,927 | 4/1954 | McCurdy et al. | 260/45.7 RL |
| 2,894,918 | 7/1959 | Killoran et al. | 521/57 |
| 3,061,584 | 10/1962 | Raley, Jr. | 260/45.8 NT |
| 3,455,873 | 7/1969 | Jenkner | 521/98 |
| 3,590,014 | 6/1971 | Burt | 521/57 |
| 4,035,315 | 7/1977 | Ingram | 521/57 |

*Primary Examiner*—Morton Foelak
*Attorney, Agent, or Firm*—Keil & Witherspoon

[57] ABSTRACT

Particulate self-extinguishing thermoplastic molding compositions based on styrene polymers containing volatile blowing agents are surface-coated with an organic bromine compound and, to stabilize the bromine compound against photodegradation, a N-hydroxyphenylbenzotriazole or a hydroxybenzophenone. The molding compositions may be used for the manufacture of foams by expanding the blowing agents at elevated temperatures.

9 Claims, No Drawings

SELF-EXTINGUISHING, EXPANDABLE STYRENE POLYMERS

The present invention relates to particulate, self-extinguishing, thermoplastic molding compositions based on styrene polymers which contain volatile blowing agents and which are surface-coated with an organic bromine compound and with stabilizers.

Expandable polystyrene which can be converted into foam plastics is usually rendered self-extinguishing by incorporation of bromine compounds. Particularly active compounds are those which contain C=C or C=N double bonds in the molecule; these bonds activate the bromine atoms. Examples of such bromine compounds are 2,5-bis-(tribromomethyl)-1,3,5-thiadiazole (German Laid-Open Application DOS No. 2,545,223), 2,4,6-tris-(tribromomethyl)-1,3,5-triazine, pentabromophenyl allyl ether (British Pat. No. 1,142,298) and hexabromobut-2-ene (German Laid-Open Application DOS No. 2,458,483).

Flameproofing agents are in most cases added to the styrene polymers during their manufacture, ie. styrene is polymerized in the presence of the bromine compound. This may result, especially in the case of the above highly active bromine compounds, in the additives acting as regulators, thereby adversely influencing the properties of the styrene polymers. In such cases it is more advantageous to apply the bromine compound to the surface of the expandable, particulate styrene polymer. Germain Laid-Open Application DOS No. 2,655,808 is concerned with this method.

We have found that foams which have been manufactured from styrene polymers coated in the above manner with flame-proofing agents tend to suffer polymer degradation, and degradation of the weld between the individual foam particles, on weathering in the open, presumably due to the action of light. It is therefore an object of the present invention to stabilize the coated styrene polymers.

We have found that this object may be achieved particularly advantageously by coating the styrene polymers with a N-hydroxyphenylbenzotriazole or with a hydroxybenzophenone.

Accordingly, the present invention relates to particulate, self-extinguishing, thermoplastic molding compositions based on styrene polymers which contain blowing agents, are surface-coated with from 0.05 to 2 percent by weight, based on the expandable styrene polymer, of an organic bromine compound A, and carry, mixed with the bromine compound, from 0.005 to 1.0 percent by weight of a N-hydroxyphenylbenzotriazole or of a hydroxybenzophenone as stabilizer B.

Preferably, they contain, in addition, one or more further stabilizers from the group consisting of:

C. from 0.001 to 1.0 percent by weight of a sterically hindered phenol and

D. from 0.001 to 0.5 percent by weight of a dialkyl-tin dicarboxylate.

It is particularly advantageous if the styrene polymers are coated with both of the additional stabilizers C and D.

When stabilizing plastics against the action of light, the pulverulent stabilizers are usually worked into the polymer melt. There, the stabilizer particles undergo molecular dispersion, so that a homogeneous solution results. It was very surprising that a stabilizing action also manifests itself in the present case, where one is not dealing with a homogeneous molecular dispersion of the stabilizer in the material to be stabilized, but where, instead, the stabilizers are merely mixed mechanically, as powders, with the bromine compound to be stabilized.

Suitable styrene polymers are polystyrene and copolymers of styrene with up to 50 percent by weight of comonomers. Examples of comonomers are α-methylstyrene, acrylonitrile and esters of acrylic acid or methacrylic acid with alcohols of 1 to 8 carbon atoms. Toughened polystyrenes, which have been produced by polymerizing styrene, with or without acrylonitrile, in the presence of elastomeric butadiene polymers, may also be used. As blowing agents, the molding compositions preferably contain liquid or gaseous organic compounds which do not dissolve the polymer and which boil below the softening point of the polymer, for example aliphatic or cycloaliphatic hydrocarbons, eg. propane, butane, pentane, hexane, heptane or cyclohexane, or halohydrocarbons, eg. methyl chloride, dichlorofluoromethane and 1,2,2-trifluoro-1,1,2-trichloroethane. It is advantageous to use from 3 to 10 percent by weight of blowing agent, based on styrene polymer. For further details, reference may be made to Kunststoffhandbuch, volume V, "Polystyrene", Carl-Hanser-Verlag, Chapter 6 "Polystyrol-Schaumstoffe" ("Polystyrene Foams").

The molding compositions are in the form of particles which advantageously are from 0.1 to 6.0 mm, especially from 0.4 to 3 mm, in size. The organic bromine compounds, in the form of fine powders, in amounts of from 0.05 to 2, especially from 0.1 to 1.0, percent by weight, based on the expandable styrene polymers, are applied, together with the stabilizers, to the surface of the particles, preferably by simple tumbling. In some cases it may be advantageous to coat the expandable particles additionally with conventional agents for reducing the mold release time, for example with glycerol monostearate or with urethanes.

To prevent caking or agglomeration of the coated particles during further processing, it is advantageous also to apply an anti-caking agent to the particles. Finely divided silica is particularly suitable for this purpose and is preferably employed in an amount of from 0.005 to 0.1 percent by weight, based on the expandable styrene polymer. Silica has the advantage that it does not have an adverse effect on the flameproofing action of the organic bromine compounds. However, in principle, any other conventional anti-caking agent, eg. zinc stearate, may also be employed. Calcium carbonate is a further suitable anti-caking agent. Furthermore, it has been found that this compound, as well as other salts, oxides and hydroxides of alkaline earth metals, prevent the processing machinery from suffering corrosion by the bromine compounds. In a preferred embodiment, therefore, from 0.001 to 0.2 percent by weight of an alkaline earth metal salt, oxide or hydroxide, is applied to the styrene polymer together with the flameproofing agent and stabilizer according to the invention. Calcium carbonate, calcium phosphate, calcium stearate, calcium oxide, magnesium carbonate and magnesium oxide are particularly preferred.

Preferred flameproofing agents A are those bromine compounds which contain at least 50 percent of bromine and possess one or more C=C or C=N double bonds in the molecule. Particularly preferred compounds are:

2,5-bis-(tribromomethyl)-1,3,4-thiadiazole

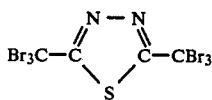

1,1,2,3,4,4-hexabromobut-2-ene

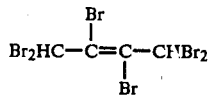

pentabromophenyl allyl ether

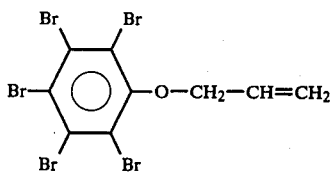

and 2,4,6-tris-(tribromomethyl)-1,3,5-triazine

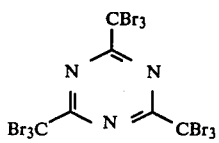

In some cases the flameproofing action can be further intensified by adding a synergistic peroxide, eg. dicumyl peroxide, in an amount of from 0.1 to 1.0 percent by weight.

Suitable stabilizers B are substituted N-hydroxyphenylbenzotriazoles of the general formula

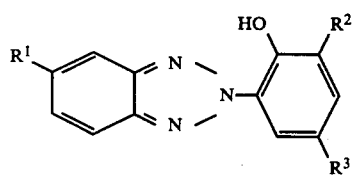

where $R^1$ is hydrogen, chlorine or alkyl of 1 to 4 carbon atoms and $R^2$ and $R^3$ are hydrogen or alkyl of 1 to 6 carbon atoms.

Preferred compounds are 2,-(2-hydroxy-3,5-di-tert.-butylphenyl)-5-chlorobenzotriazole ($B_1$), 2-(2-hydroxy-3,5-di-tert.-amylphenyl)-benzotriazole ($B_2$), 2-(2-hydroxy-5-methylphenyl)-benzotriazole ($B_3$) and 2-(2-hydroxy-3-tert.-butyl-5-methylphenyl)-5-chlorobenzotriazole ($B_4$).

Other suitable stabilizers B include substituted hydroxybenzophenones of the formula

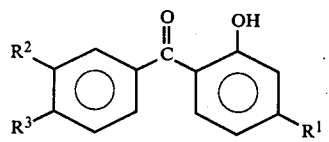

where $R^1$, $R^2$ and $R^3$ are hydrogen, alkyl or alkoxy. 2-hydroxy-4-methoxy-benzophenone ($B_5$) is preferred.

Suitable sterically hindered phenols C are in particular those of the general formula

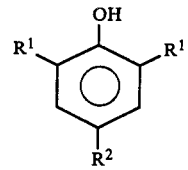

where $R^1$ is alkyl of 1 to 6 carbon atoms, preferably tert.-butyl, and $R^2$ is also alkyl of 1 to 6 carbon atoms or is an ester radical, eg. —$CH_2$—$CH_2COOR^3$ (where $R^3$ is alkyl of 1 to 20 carbon atoms or aryl of 6 to 20 carbon atoms). 1,6-Hexanediol bis-3-(3,5-di-tert.-butyl-4-hydroxyphenyl)-propionate ($C_1$) is preferred.

Component D is preferably dibutyl-tin dilaurate ($D_1$).

Other conventional flameproofing agents may also be present in the molding compositions. The latter may also contain further components, eg. fillers, colored pigments, lubricants, antistatic agents, aging stabilizers or compounds which assist foaming.

The molding compositions of the invention can be used to produce self-extinguishing foams with densities of from 5 to 100, preferably from 10 to 50, g/l. Foaming is effected by expanding the blowing agent at an elevated temperature, eg. by sintering the particles in molds, or by extrusion.

In the Examples, parts are per 100 parts by weight of expandable polystyrene.

EXAMPLE

An expandable polystyrene containing 6.4 percent by weight of n-pentane and having a mean particle diameter of 1.5 mm was coated by tumbling for 3 minutes in a paddle mixer with various mixtures of flameproofing agents and stabilizers. In all the experiments, the mixture contained 0.4 part of glycerol monostearate, with or without silica ($SiO_2$) of mean particle size 12 μm, or calcium carbonate ($CaCO_3$), as an anti-caking agent.

The expandable coated polystyrene particles were foamed by treatment with steam and after storage for one day were fused together, by further treatment with steam in a steam chamber, to give foam blocks. Foam strips measuring 0.2×6×20 cm were cut from these blocks by means of an electrically heated wire. The effectiveness of the stabilizer system was tested on these strips both by outdoor weathering and by irradiation from a flat-plate exposure unit.

In the outdoor weathering test, the unstabilized samples showed, after 4 weeks (in summer), destruction of the welds between the individual particles at the surface of the sample, and severe yellowing of the foam, whilst the samples stabilized according to the invention showed no damage after 4 weeks. In the irradiation test the samples were each irradiated for 70 hours with a fluorescent lamp (wavelength range about 300–350 nm) and the intrinsic viscosity was then determined in accordance with DIN 53,726 to provide a measure of the degradation of the polystyrene.

The Table shows various mixtures used for coating the polystyrene particles, and the intrinsic viscosities determined. Experiments 1 and 2 are Comparative Experiments.

TABLE

| Experiment | Flameproofing agent parts | Flameproofing agent type | Stabilizer parts | Stabilizer type | Anti-caking agent parts | Anti-caking agent type | Intrinsic viscosity [cm³/g] |
|---|---|---|---|---|---|---|---|
| 1 | — | — | — | — | — | — | 76.4 |
| 2 | 0.3 | $A_1$ | — | — | 0.03 | $CaCO_3$ | 59.3 |
| 3 | 0.3 | $A_1$ | 0.15<br>0.15 | $B_1$<br>$B_1$ | 0.03 | $CaCO_3$ | 68.0 |
| 4 | 0.3 | $A_1$ | 0.15 | $B_1$ | 0.03 | $CaCO_3$ | 69.5 |
| 5 | 0.3 | $A_1$ | 0.03<br>0.02 | C<br>D | 0.03 | $CaCO_3$ | 71.1 |
| 6 | 0.2 | $A_1$ | 0.1<br>0.02<br>0.016 | $B_1$<br>C<br>D | 0.02 | $CaCO_3$ | 74.0 |
| 7 | 0.3 | $A_1$ | 0.3 | $B_2$ | 0.025 | $SiO_2$ | 70.0 |
| 8 | 0.3 | $A_1$ | 0.15<br>0.15 | $B_2$<br>$B_2$ | 0.025 | $SiO_2$ | 65.0 |
| 9 | 0.3 | $A_1$ | 0.15 | $B_3$ | 0.025 | $SiO_2$ | 70.1 |
| 10 | 0.3 | $A_1$ | 0.03 | C | 0.03 | $CaCO_3$ | 64.0 |
| 11 | 0.3 | $A_1$ | 0.15<br>0.15 | $B_4$<br>$B_4$ | 0.03 | $CaCO_3$ | 64.6 |
| 12 | 0.3 | $A_1$ | 0.03 | C | 0.03 | $CaCO_3$ | 66.2 |
| 13 | 0.3 | $A_1$ | 0.15 | $B_5$ | 0.03 | $CaCO_3$ | 63.8 |
| 14 | 0.5 | $A_2$ | 0.25<br>0.05<br>0.04 | $B_1$<br>C<br>D | 0.03 | $CaCO_3$ | 75.8 |
| 15 | 0.8 | $A_3$ | 0.4<br>0.08<br>0.064 | $B_1$<br>C<br>D | 0.03 | $CaCO_3$ | 71.6 |
| 16 | 0.3 | $A_4$ | 0.15<br>0.03<br>0.024 | $B_1$<br>C<br>D | 0.03 | $CaCO_3$ | 69.1 |

We claim:

1. A molding composition which comprises: self-extinguishing, thermoplastic particles of a styrene polymer having a size of from 0.4 to 3 mm and containing volatile blowing agents, which particles are surface-coated by simple tumbling with from 0.05 to 2.0 percent by weight, based on the expandable styrene polymer, of an organic bromine compound A, and wherein the surface additionally carries, mixed with the bromine compound, from 0.005 to 1.0 percent by weight of a N-hydroxyphenylbenzotriazole or of a hydroxybenzophenone as stabilizer B.

2. A molding composition as set forth in claim 1, which in addition to B contains one or more of the following further stabilizers:
   C. from 0.001 to 1.0 percent by weight of a sterically hindered phenol and
   D. from 0.001 to 0.5 percent by weight of a dialkyl-tin dicarboxylate.

3. A molding composition as set forth in claim 1, wherein from 0.005 to 0.1 percent by weight of finely divided silica and/or from 0.001 to 0.2 percent by weight of an alkaline earth metal salt, oxide or hydroxide, is applied to the surface together with the flameproofing agent and the stabilizers.

4. A molding composition as set forth in claim 1, wherein the frameproofing agent A is an organic bromine compound which contains at least one C=C or one C=N double bond in the molecule.

5. A molding composition as set forth in claim 1, wherein the flameproofing agent A is 2,5-bis-(tribromomethyl)-1,3,4-thiadiazole, 1,1,2,3,4,4-hexabromobut-2-ene, pentabromophenyl allyl ether or 2,4,6-tris-(tribromomethyl)-1,3,5-triazine.

6. A molding composition as set forth in claim 1, wherein the stabilizer B is a substituted N-hydroxyphenylbenzotriazole of the formula

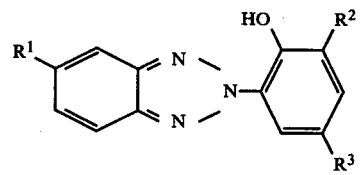

where $R^1$ is hydrogen, chlorine or an alkyl of 1 to 4 carbon atoms and $R^2$ and $R^3$ are hydrogen or alkyl of 1 to 6 carbon atoms.

7. A molding composition as set forth in claim 1, wherein the stabilizer B is a substituted hydroxybenzophenone of the formula

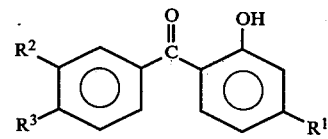

where $R^1$, $R^2$ and $R^3$ are hydrogen, alkyl or alkoxy.

8. A molding composition as set forth in claim 1, wherein the stabilizer C is a sterically hindered phenol of the formula

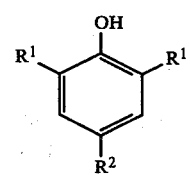

where $R^1$ is alkyl of 1 to 6 carbon atoms and $R^2$ is alkyl of 1 to 6 carbon atoms or an ester radical —$CH_2$—$CH_2$—$COOR^3$ (where $R^3$ is alkyl of 1 to 20 carbon atoms or aryl of 6 to 20 carbon atoms.

9. A molding composition as set forth in claim 1, wherein the stabilizer D is dibutyl-tin dilaurate.